(12) United States Patent
Gleichauf

(10) Patent No.: US 10,721,240 B2
(45) Date of Patent: Jul. 21, 2020

(54) BLOCKCHAIN MINING USING TRUSTED NODES

(71) Applicant: Arm Limited, Cambridge (GB)

(72) Inventor: Paul Harry Gleichauf, Los Altos, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/383,420

(22) Filed: Apr. 12, 2019

(65) Prior Publication Data

US 2019/0306176 A1  Oct. 3, 2019

Related U.S. Application Data

(63) Continuation of application No. 15/295,695, filed on Oct. 17, 2016, now Pat. No. 10,291,627.

(51) Int. Cl.
| | |
|---|---|
| *H04L 29/06* | (2006.01) |
| *H04L 29/08* | (2006.01) |
| *H04W 8/24* | (2009.01) |
| *H04L 9/32* | (2006.01) |
| *H04W 12/06* | (2009.01) |
| *H04W 12/10* | (2009.01) |

(52) U.S. Cl.
CPC .......... *H04L 63/123* (2013.01); *H04L 9/3236* (2013.01); *H04L 67/1097* (2013.01); *H04W 8/24* (2013.01); *H04W 12/06* (2013.01); *H04W 12/10* (2013.01); *H04L 2209/38* (2013.01); *H04L 2209/56* (2013.01); *H04L 2209/80* (2013.01); *H04L 2463/102* (2013.01)

(58) Field of Classification Search
CPC combination set(s) only.
See application file for complete search history.

(56) References Cited

U.S. PATENT DOCUMENTS

| | | | |
|---|---|---|---|
| 2002/0120575 A1* | 8/2002 | Pearson | G06F 21/57 705/51 |
| 2014/0289382 A1* | 9/2014 | Chan | G06F 11/1464 709/221 |
| 2014/0344015 A1* | 11/2014 | Puertolas-Montanes | G06Q 20/10 705/7.29 |
| 2015/0170112 A1* | 6/2015 | DeCastro | G06Q 20/381 705/39 |
| 2015/0356524 A1* | 12/2015 | Pennanen | G06Q 20/065 705/71 |
| 2016/0292672 A1* | 10/2016 | Fay | G06Q 20/363 |
| 2018/0053182 A1* | 2/2018 | Mokhasi | G06Q 20/3829 |
| 2018/0060835 A1* | 3/2018 | Martin | G06Q 30/0261 |
| 2018/0068091 A1* | 3/2018 | Gaidar | G06F 21/10 |
| 2018/0285879 A1* | 10/2018 | Gadnis | H04L 9/3231 |

\* cited by examiner

*Primary Examiner* — Malcolm Cribbs
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more mobile communication devices and/or processing devices to facilitate and/or support one or more operations and/or techniques for blockchain mining using trusted nodes, such as via democratization of associated resources for fair blockchain mining, for example.

20 Claims, 5 Drawing Sheets

BLOCKCHAIN MINING USING TRUSTED NODES

BACKGROUND

1. Field

The present disclosure relates generally to blockchain infrastructure and, more particularly, to blockchain mining using trusted nodes.

2. Information

Typically, although not necessarily, a blockchain is a content or data structure having a number of serially ordered, back-linked blocks of validated on-line transactions. A block is typically, although not necessarily, a container-type content or data structure that aggregates a list of on-line transactions and references—or "links" back—to a previous block in a chain, also called a "parent" block, via a digital fingerprint of the previous block or so-called block "hash." As such, in a blockchain, each block contains a hash of its parent block, thus, effectively linking blocks in the chain via a sequence of hashes all the way to the very first block or so-called "genesis" block. Because a current block's hash incorporates and, thus, affects a previous block's hash in a blockchain, changing or modifying a parent block would modify a hash of its child's block. In turn, changing or modifying a child block would modify a hash of a grandchild's block and so on. Such a structure may, for example, ensure that, once a block has a larger or otherwise sufficient number of subsequent or next generation blocks, the block may be difficult to modify due, at least in part, to an expensive effort involving re-computations of all previous blocks. As such, if an existing block in a blockchain is changed, then subsequent blocks must be recomputed, at a considerable computational cost. Therefore, older blocks age to become accepted transaction history, and more secure as a result.

In some instances, transactions within a block may, for example, be validated by a particular network node, known as a mining node or "miner," such as by finding a correct solution to a mathematical problem or puzzle via repeated cryptographic hashing operations. Having solved a puzzle, a miner may, for example, receive a reward and/or appropriate fee and may record its validated block of on-line transactions in a blockchain. At times, to be included in a blockchain, a validated block may also be verified or confirmed, such as by other miners on a network to ensure that the block complies with consensus rules (e.g., includes a correct solution to a puzzle, has a syntactically valid structure, etc.), network-wide or otherwise. To solve a puzzle, however, a miner may compete with other miners on a network, such as by generating fixed-length hashes by repeatedly trying to vary an output of a hash a very large number of times, for example, until a resulting hash matches specific requirements. To achieve this, a miner may expend significant computing effort, processing and/or electrical power, among other things.

In this high-intensity computing environment with ever-more-difficult blockchain puzzles, a likelihood of a miner without highly specialized hashing hardware capable of more effectively and/or efficiently finding a solution to a blockchain puzzle is rather small. As such, blockchain's incentive system encourages miners to adopt more efficient technology and, thereby, at least keep up with escalating difficulty of mining each new generation of blocks, and indirectly to jostle to monopolize potential earnings through utilizing continuously improved mining technology. Today, to make mining profitable or sustainable, miners may utilize application-specific integrated circuits (ASICs) with a significant hashing power, such as in relation to graphic processing units (GPUs), field programmable gate arrays (FGPA), etc. used in the past. As such, mining has become a business with significant capital costs (e.g., for an ASIC accelerated hash computation system, a place to house it, network connections, etc.) as well as operating costs (electricity, monitoring personnel, etc.), meaning that ASIC miners geographically clustered near cheaper electrical power and/or cooler climates (e.g., for ASIC heat dissipation, etc.), for example, may gain an unfair advantage over other miners on a network. As a result, blockchain mining has become increasingly concentrated in particular geographic areas, such as in cooler (e.g., mountainous, etc.) places with readily accessible (e.g., unregulated, etc.) and/or cheaper hydro-power, for example.

In some instances, the ability to compete for lesser reward over time (possibly supplemented with transaction fees), such as due to a diminishing blockchain reward structure, for example, and/or exponential increase in mining difficulty may lead to a rapid escalation of more powerful hardware in fewer hands and/or particular geographic areas. This may, for example, disrupt a blockchain consensus mechanism, may lead to a decline in blockchain protocol security, may have international trust and/or resiliency implications, etc., and may ultimately lead to a failure of a blockchain mining market. For example, at times, a blockchain thought to be secure due, at least in part, to its length, as discussed above, may be undone by a group of conspiring miners having a significant share of a mining power via creating a longer chain (e.g., via a fork, etc.) and, thus, reversing previous blocks. As such, in some instances, security of a blockchain may require knowing that participating miners have bounded and/or trusted computational capability, such as to guard against and/or detect potential selfish mining attacks, for example. Yet, current blockchain infrastructure may not be capable of determining or measuring trustworthiness of mining nodes, such as in terms of their computational capability, for example, especially in a blockchain network where nodes are generally unknown and/or allowed to join or leave the network with little or no restrictions.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
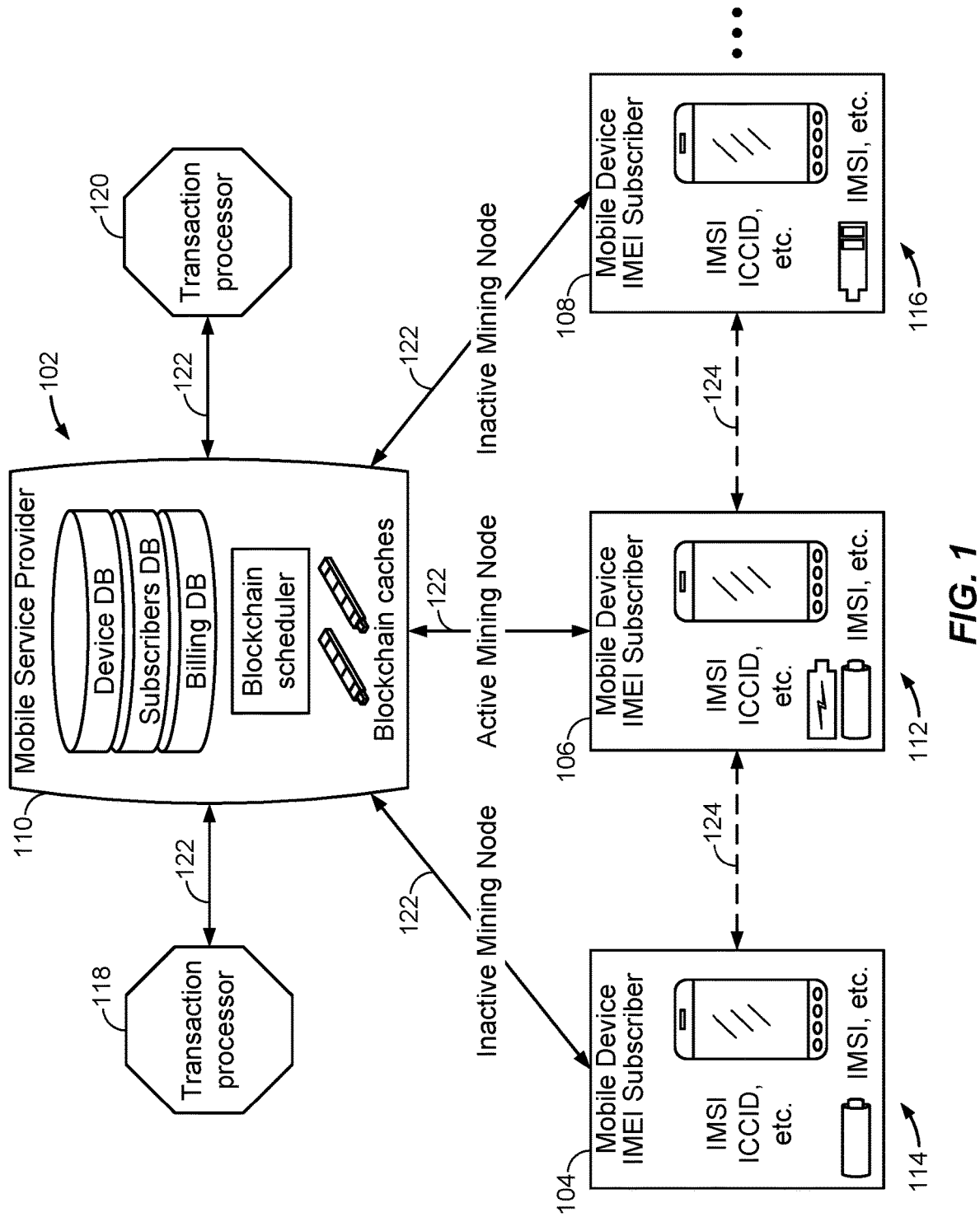
FIG. 1 is a schematic diagram illustrating features associated with an implementation of an example use case or scenario of an operating environment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for blockchain mining using trusted nodes, such as via democratization of associated resources for fair blockchain mining. For example, as will be seen, in some instances, participants providing blockchain mining services may benefit from a variety of incentive plans that may be dynamically updated to reflect a value of resources that participants may contribute. In this context, "fair," "fairness," or like terms with respect to blockchain mining refer to a principle allowing miners to track available rewards at a given time, such as while a blockchain mining process equitably and/or consistently honors these services and/or incentives. As also discussed below, in some instances, these one or more operations and/or techniques may, for example, be advantageously implemented, in whole or in part, in and/or with mobile communication devices. As used herein, "mobile device," "mobile communication device," "location-aware mobile device," or like terms may be used interchangeably and refer to any kind of special purpose computing platform or apparatus that may from time to time have a position or location that changes. In some instances, a mobile communication device may, for example, be capable of estimating its location using one or more appropriate techniques and/or communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, navigation systems, etc., or any other type of device capable of being identified and/or authenticated via one or more communication protocols, wireless or otherwise.

In this context, blockchain "mining" or simply "mining" refers to a process of validating a block of on-line transactions by a mining node or "miner," such as for inclusion in a blockchain, for example, via solving a blockchain problem or puzzle, which may qualify the mining node or miner for a reward and/or appropriate fee. As used herein, the terms "mining node" and "miner" may be used interchangeably and refer to a network node capable of solving a blockchain problem or puzzle via one or more cryptographic hashing operations, such as using a proof-of-work-type process or approach. Claimed subject matter is not limited to a particular process or approach, of course. For example, in some instances, a proof-of-stake-type process or approach may be used, in whole or in part, such as employing an escrow account for a particular miner and/or levying against disincentives to prevent or lessen improper miner behavior. Thus, even though a proof-of-work-type process or approach is used herein, such as for ease of discussion, any other suitable processes or approaches, consensus-based or otherwise, may be utilized herein, in whole or in part, such as instead of or in any combination with a proof-of-work-type process or approach. For purposes of explanation, to solve a blockchain puzzle, a miner of a particular block may hash the block's header repeatedly, such as, for example, by changing one parameter at the end of the header's hash, a so-called "nonce," until a resulting hash meets a specific criteria, typically, a value that is equal or less than a current target (e.g., a value of a hash of a block's header, etc.). In some instances, one or more cryptographic hashing operations may, for example, be implemented, at least in part, via a SHA256-type process (e.g., double-SHA256, etc.), such as for a target comprising a 256-bit number written as hexadecimal, though claimed subject matter is not so limited. Any other suitable cryptographic hashing operations now known (e.g., Scrypt, Blake-256, CryptoNight, HEFTY1, Quark, SHA-3, scrypt-jane, scrypt-n, etc.) and/or later developed may also be employed, in whole or in part, or otherwise considered.

An "on-line transaction" or simply "transaction" refers to a signed on-line content structure indicating an agreement, communication, recordation, or some other electronic or on-line event. For example, a transaction may indicate a transfer of value, such as a cryptographic currency, etc., transfer of assets and/or rights, such as a real estate property, confirmation of an identity, or the like. A transaction may, for example, be signed via any suitable digital signature, such as via a public key, private key, or the like, or any combination thereof. At times, a transaction may reference a previous transaction's output as new transaction input, for example, and may assign one or more input values to new output, as was indicated. A transaction may or may not be encrypted. As used herein, "on-line" refers to a type of a communication that may be implemented electronically, such as via one or more suitable communications networks (e.g., wireless, wired, etc.), for example. It should be understood, however, that these are merely examples of a transaction or on-line transaction, and claimed subject matter is not limited in this respect.

"Content," as the term used herein, should be interpreted broadly and refers to signals, such signal packets, for example, and/or states, such as physical states on a memory device, for example, but otherwise is employed in a manner irrespective of format, such as any expression, representation, realization, and/or communication, for example. Content may comprise, for example, any information, knowledge, and/or experience, such as, again, in the form of signals and/or states, physical or otherwise. In this context, "electronic" or "on-line content" refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, web page, or the like. Claimed subject matter is not intended to be limited to these particular examples, of course.

As was indicated, one or more network nodes may comprise, for example, one or more mining nodes capable of finding a valid proof of work for new blocks via repeated cryptographic hashing operations. Depending on an implementation, a mining node may comprise, for example, a full node, a lightweight node, or any combination thereof. In this context, a "full node" refers to a network node capable of facilitating and/or supporting all or most processes for blockchain mining. For example, a full node may be capable of finding a valid proof of work, network routing, providing wallet services, maintaining a full copy of a blockchain in its memory, verify and/or propagate transactions, enforce consensus rules, or the like. A "lightweight node," as the term used herein, refers to any mining node other than a full node. For example, a lightweight node may be capable of finding a valid proof of work for a block of on-line transactions and/or communicating block-related updates for inclusion in a blockchain, but may not be capable of maintaining a full copy of a blockchain in its memory, such as due, at least in part, to memory constraints, as one possible example. Thus, in some instances, a lightweight node may, for example, rely on one or more other nodes (e.g., other lightweight nodes, full nodes, server devices on a network, etc.), such as for transaction verifications, block validations, etc. One particular example of a lightweight node may include a simplified payment verification (SPV) node capable of downloading block headers, rather than full blocks, for example, for a blockchain. Claimed subject matter is not so limited, of course.

As alluded to previously, in some instances, blockchain's security may be jeopardized or affected, for example, by a geographically localized syndicate of miners controlling a preponderance of mining computational resources, such as through access to cheaper power, superior mining technology, or the like. In some instances, these or like geographic concentrations, particularly over constrained network links, may also impact or affect blockchain's security due, at least in part, to network-related "bottlenecks." As was also indicated, since a typical blockchain may allow for a participation of unknown and, thus, untrusted nodes, and since verification of nodes' identity and/or computational capacity is outside of a typical blockchain's protocol, at times, blockchain infrastructure may be vulnerable to selfish mining attacks, among others. Since, in some instances, a blockchain may be offered and/or employed as and/or in connection with a suitable service (e.g., for banking transaction processing, etc.), as discussed below, this may, for example, present a concern in some instances. For example, in banking, financial, or like sectors, among others, allowing unknown and/or untrusted parties to validate transactions, such as clear payments, remittances, or the like may not be desirable and/or prudent. In addition, at times, network-related scalability may affect performance of blockchain infrastructure, for example, considering that a relatively larger number of miners may be necessary or otherwise useful to validate transactions. For example, more "fragile" or less scalable networks may fail to keep a larger number of mining nodes on-line (e.g., operational, etc.), which, in some instances, may make a task of finding a valid solution more difficult.

To address these or like issues, at times, banking, financial, or like services employ private blockchains that may be of relatively limited use, such as for inter-bank funds transfers, for example, by allowing another trusted bank(s) to participate, such as using trusted hardware to add blocks to a collective blockchain and keeping miners select, secured, and/or relatively small in number. This approach, however, may not fully benefit from decentralized and/or distributed nature of blockchain infrastructure, such as, for example, beyond the cloud-like model of being able to dynamically distribute load among many parties and/or track the costs. As was indicated, at times, a larger numbers of participating authenticated platforms of known capacity may, for example, increase a security of a blockchain. Accordingly, it may be desirable to develop one or more methods, systems, and/or apparatuses that may generate and/or integrate trusted blockchain infrastructure with an operations support system (OSS) or like computing platform of a service provider, such as to implement blockchain mining in a larger-scale controlled computing environment, which may include a worldwide network of nodes, as one example, with provable computational capability.

Thus, as will be described in greater detail below, in an implementation, one or more blocks of on-line transactions may, for example, be validated, at least in part, via finding valid proof of work while using idle cycles of processing units of network-connected mobile devices registered with one or more mobile service providers (MSPs). Here, mobile device-related records may be used, at least in part, to address lack of trustworthiness or like issues discussed above, such as via associated unique identities, for example, indicative of mobile devices' computational capabilities. More specifically, based, at least in part, on one or more identifiers, such as an International Mobile Equipment Identity (IMEI), an International Mobile Subscriber Identity (IMSI), or the like, an MSP may be capable of certifying computational capabilities of its mobile devices and/or proving that a particular mobile device is not an ASIC-accelerated miner with an unfair advantage.

As also discussed below, charging cycles of participating mobile devices may be extended in some manner, such as at night while a network is underutilized, for example, and used, in whole or in part, for finding valid proof of work, communicating updates to a blockchain, and/or other applicable processes. Thus, in some instances, one or more operations and/or techniques for blockchain mining using trusted nodes may, for example, provide advantages, such as via enabling a service provider to offer one or more blockchain-related services, among others, in exchange for a reward and/or appropriate fee, as will also be seen. At times, utilization of trusted mining entities may also prevent rapid increases in mining capacity on a relatively fast cadence. Namely, with a possibility of an end-of-Moore's-Law, a Nakamoto-based model for escalating difficulty may, for example, become problematic since, at times, advancing cadence of difficulty may not reflect rates of advancing hardware capabilities. As was also alluded to previously, one or more approaches discussed herein may yield a more predictable and/or controlled blockchain infrastructure.

FIG. 1 is a schematic diagram illustrating features associated with an implementation of an example use case or scenario of an operating environment 100 that may be used, in whole or in part, to facilitate and/or support one or more operations and/or techniques for blockchain mining using trusted nodes. As was indicated, in some instances, example operating environment 100 may, for example, be implemented, in whole or in part, in connection with a blockchain service that may be offered and/or provided by a mobile service provider (MSP), referenced generally via an arrow at 102. As seen, MSP 102 may, for example, have a plurality of subscribing mobile devices, referenced generally at 104, 106, and 108, such as registered on its network via one or more unique identifiers, discussed below. It should be noted that, even though a certain number of particular devices, networks, systems, databases, features, links, etc. are illustrated, any number of suitable devices, networks, systems, databases, features, links, etc. may be implemented herein. For example, in some instances, a number of service providers may join efforts, collaborate, etc. so as to offer and/or provide mobile and/or blockchain services in a number of jurisdictions, even globally. For example, mobile service providers may confederate around the globe to provide a global service across a diurnal cycle with larger populations charging their phones or otherwise relatively inactive. Also, depending on an implementation, a single and/or double-sided arrow, if shown, may, for example, indicate a unidirectional flow, a bi-directional flow, or any combination thereof, such as with respect to signals, operations, processes, communications, and/or the like that may comprise and/or be represented via one or more digital signals. In some instances, example operating environment 100 may be implemented in an outdoor environment, indoor environment, or any combination thereof. It should also be noted that example operating environment 100 should not be limited to a particular service provider, such as MSP 102, for example. Any other suitable service provider, such as an insurance company, money transfer service, on-line marketplace service, e-commerce service, financial service, communications service, or the like may be capable of implementing one or more operations and/or processes discussed herein, in whole or in part.

Thus, according to an implementation, a user of a mobile device, such as mobile device 104, 106, 108, etc. may, for example, be given an option of joining a community of wireless subscribers, such as via an opt-in feature discussed below, so as to contribute an idle cycle from the associated mobile device for mining blocks of on-line transactions. At times, an idle cycle from mobile device 104, 106, 108, etc. may, for example, be contributed as it completes its normal charging cycle, such as at night while a network is usually underutilized, as one possible example. In exchange, an opt-in user may receive and/or share with MSP 102 a reward and/or appropriate fee earned as part of a blockchain mining process, such as if a mining node running on the user's mobile device successfully mines a particular block, for example. A reward and/or fee may comprise any suitable reward and/or fee, such as, for example, a monetary reward, a non-monetary reward, a transaction fee, etc., or any combination thereof. For example, MSP 102 may determine as part of its customer service agreement whether a reward and/or fee may take a form of a direct payment, rebate on a subscriber's billing and/or phone lease agreement, coupon, or any other suitable reward and/or fee (e.g., digital currency, transaction validation fees, etc.). Claimed subject matter is not so limited, of course. For example, in some instances, a form, amount, etc. of a reward and/or fee may be determined, at least in part, by any other suitable party (e.g., a bank, etc.) or a combination thereof.

As illustrated, in an implementation, unlike typical blockchain infrastructure, MSP 102 may comprise, for example, an OSS, referenced at 110, which may include and/or be associated with one or more databases or like repositories comprising one or more records of mobile devices 104, 106, 108, etc. For example, one or more records may comprise standardized identifiers and/or keys, such as an International Mobile Subscriber Identity (IMSI), an Integrated Circuit Card Identity (ICCID), an International Mobile Equipment Identity (IMEI), a Mobile Station Integrated Services for Digital Network number (MSISDN), or the like, or any combination thereof. As was indicated, using these or like records, MSP 102 may, for example, be capable of identifying subscribing users, types, makes, models, etc. of mobile devices 104, 106, 108, etc. and, as such, may be capable of assessing and/or proving their computational capabilities and/or bounded computational capacity of an associated network. In some instances, these or like unique identifiers may also be used, at least in part, for billing purposes, such as by MSP 102. The wireless communications protocols (e.g. 3GPP, etc.) assure that a device owned by a user is authenticated to be able to transmit and receive data. This authentication may make these or like communications more secure (e.g., in the sense of genuinely attributable to a source, etc.) than standard IP (e.g., without a VPN or IPsec, etc.). Thus, such an "authentic authentication" may make participation of associated miners more secure. As such, network-connected mobile devices 104, 106, 108, etc. may comprise a computational pool of resources with trusted blockchain infrastructure for more effective and/or more efficient blockchain mining, such as, for example, via an increased hashing rate, as one possible example. As also illustrated, OSS 110 may comprise, for example, one or more databases with billing information, account balances, reward balances, fee amounts, and/or the like, such as for billing, reward-related or otherwise, or like processes.

As was indicated, although not shown, example operating environment 100 may comprise, for example, any other suitable type and/or number of computing devices and/or platforms capable of facilitating and/or supporting one or more operations and/or techniques for blockchain mining using trusted nodes. For example, depending on an implementation, example operating environment 100 may comprise one or more server devices, processing units, gateway devices, base transceiver stations, access points, and/or the like. In some instances, example operating environment 100 may comprise, for example, one or more location servers, such as for estimating locations of mobile devices 104, 106, 108, etc. using one or more applicable techniques. These techniques may include, for example, location determination via GPS, Wi-Fi, radio heat map, or like positioning. These techniques are generally known and need not be described herein in greater detail. Here, unlike in typical (e.g., pseudo-anonymous, etc.) blockchain infrastructure, locations of participating mobile devices may, for example, be used, at least in part, to comply with government-mandated regulations, taxation, financial reporting, or the like, if applicable, such as in connection with banking or other transaction processing, among other things.

As also seen, OSS 110 may comprise, for example, a blockchain scheduler that may be used, at least in part, to schedule and/or prioritize various tasks, such as transactions into blocks, blocks to be validated for addition to a blockchain, etc., match these or like tasks to currently available resources and/or constraints (e.g., network-related, etc.), or the like. For example, certain mining nodes, such as those completed their charging cycles (e.g., 100%, etc.) may be scheduled to wait in a so-called "ready to mine" pool, such as with reference to associated resource-related profiles. Certain other mining nodes, such as those nearly charged (e.g., at the end of their charging cycles, at 95%, etc.), for example, may be scheduled for modest power drain so as to ensure a full charge at an expected end of charging time, which may be based, at least in part, on typical or observed charging patterns. In some instances this may, for example, affect fairness in terms of an allocation of incentives based, at least in part, on effort successfully spent. In some instances, a blockchain scheduler may, for example, transmit one or more messages to one or more applicable nodes on an associated network. At times, one or more patterns of use may, for example, be based, at least in part, on one or more machine learning approaches, including per user, such as instead of or in addition to statistically across a user population. Messages may include, for example, an estimated degree of puzzle difficulty, a potential reward and/or fee in order to assist in prioritizing validation and/or participation choices, or the like.

At times, a blockchain scheduler may, for example, facilitate and/or support a selection of an author of a next or new block for writing, as discussed in greater detail below. In some instances, a blockchain scheduler may, for example, implement writing of a new block of transactions, thereby eliminating cost of rewarding an author of a new block and/or an overhead of delegation of such a role to a more recent winner for validating a last block or other selection approaches. A blockchain scheduler may also track a typical election of an author of a next block, such as part of its reward and/or fee approach, for example, such as in connection with a typical protocol rotating such a role among winning nodes. As was indicated, OSS 110 may comprise, for example, one or more cached copies of a blockchain, such as for access and/or distribution, for example, since the blockchain may grow significantly larger over time and, as such, may strain or tax available memory resources of participating mobile devices (e.g., 104, 106, 108, etc.). A blockchain cache may, for example, be used, at least in part, for verification of applicable transactions and/or blocks against a blockchain of interest, just to illustrate one possible implementation. Claimed subject matter is not so limited, of course. For example, in some instances, one or more applicable blockchain caches may also be stored at a gateway device or other suitable device(s) on an associated network, such as a base station transceiver.

Thus, according to an implementation, MSP 102 may provide a mining application (e.g., via OSS 110, etc.), such as for installation on an applicable mobile device (e.g., 104, 106, 108, etc.) via any suitable technology and/or approach (e.g., push and/or pull technology, in-store and/or web download, factory pre-installation, etc.). A mining application may, for example, run in the background of an operating system, such as transparent to a user of a participating mobile device and may monitor mobile device's charging cycles. In some instances, such as if an applicable mobile device (e.g., 104, 106, 108, etc.) makes its charging state visible to other devices on a network (e.g., to a blockchain scheduler, OSS, etc.), a mining application may, for example, indicate charging progress, which a blockchain scheduler may take into account while preparing to broadcast and/or target blocks for mining. In some instances, an operating system of a mobile device may generally monitor and/or even control charging behaviors, but may not share that information with one or more other currently running host applications. At times, in the absence of a mechanism for a mining application to know a charging state, MSP 102 may, for example, be capable of inferring such a state from one or more other sources, such as, for example, via accessing a log with a call and data activity, utilizing time-of-day, or the like. In some other instances, such as if an applicable mobile device (e.g., 104, 106, 108, etc.) does not make its charging state visible to other devices on a network, a mining application may, for example, initiate a message about its availability, such as if an applicable mobile device is ready to participate as a miner. As such, an installed mining application may, for example, transform an opted-in mobile device into a mining node (e.g., full, lightweight, etc.), which may be active, as referenced at 112, or inactive, as referenced at 114 and 116, which may depend, at least in part, on a charging cycle of a respective mobile device.

Inactive mining nodes 114 and 116, illustrated generally via a lack of a charging bar and an incomplete status of a battery icon, respectively, may comprise, for example, network nodes that are not actively mining a new block (e.g., via solving a blockchain puzzle via a proof-of-work-type process, etc.), but rather marshalling their power in preparation for mining, such as passing content to other nodes, independently verifying validity of one or more previous blocks, or the like. In some instances, inactive mining nodes (e.g., 114, 116, etc.) may also be capable of accessing and/or requesting a cached blockchain, for example. As also shown via a plug icon and full battery icon of mobile device 106, if requirements for a battery level are met, a host mining application may activate current mining activity, such as start validating one or more blocks of transactions, for example, until such time as a user of mobile device 106 disconnects from charging, at which point associated mining node 112 may become an inactive mining node.

As also illustrated, in an implementation, example operating environment 100 may comprise, for example, one or more transaction processors, referenced generally at 118 and 120. Depending on an implementation, a transaction processor (e.g., 118, 120, etc.) may comprise, for example, any suitable entity, such as a business entity, on-line retailer, digital content provider, bank and/or a consortium of banks processing credit card payments (e.g., Visa®, MasterCard®, American Express®, Square®, Stripe, PayPal® Braintree, etc.), service provider, wireless or otherwise, capable of authenticating and/or authorizing services in cooperation with their customers, etc., just to illustrate a few possible examples, managing one or more applicable transactions. For example, at times, a transaction processor may outsource management of one or more applicable transactions to a suitable blockchain provider, such as MSP 102, which may implement a number of blockchains (e.g., private, public, etc.) to accommodate the transaction processor. MSP 102 may, for example, implement a blockchain that may be specific to a particular transaction processor, may implement a blockchain that may be shared by a plurality of transaction processors, such as in connection with one or more appropriate confidentiality protocols, or the like. At times, transaction processors 118, 120, etc. may, for example, be offered by MSP 102 as an additional service feature (e.g., for a fee, etc.). Thus, transaction processors 118, 120, etc. may, for example, provide an appropriate transaction processing service themselves and/or as a cloud "over flow" service that fills in the gaps during times of higher demand.

As illustrated generally via communication links 122, MSP 102 may be capable of communicating with applicable mobile devices, mining nodes, transaction processors, and/or other suitable devices not shown, such as via a cellular telephone and/or other communications network (e.g., wireless, wired, etc.), for example. In some instances, as referenced via communication links 124, participating mobile devices may, for example, be capable of communicating with each other, such as via peer-to-peer-type communications, as one possible example, so as to propagate, verify, confirm, etc. one or more transactions, blocks of transactions, etc., and/or other suitable purposes. It should be noted that users of applicable mobile devices (e.g., 104, 106, 108, etc.) may or may not have visibility into what its associated mining node is doing on behalf of MSP's other customers. For example, at times, a user of a mobile device may not know what the mobile device is doing on behalf of a transaction processor, MSP, etc. In some instances, a user of a mobile device may be able to know that a mining application is running and/or consuming resources, for example, just not what the nature of the resource consumption is beyond the named application. A user of a mobile device may, for example, be capable of turning a mining application on and/or off, deleting it, or the like.

Figure 2:
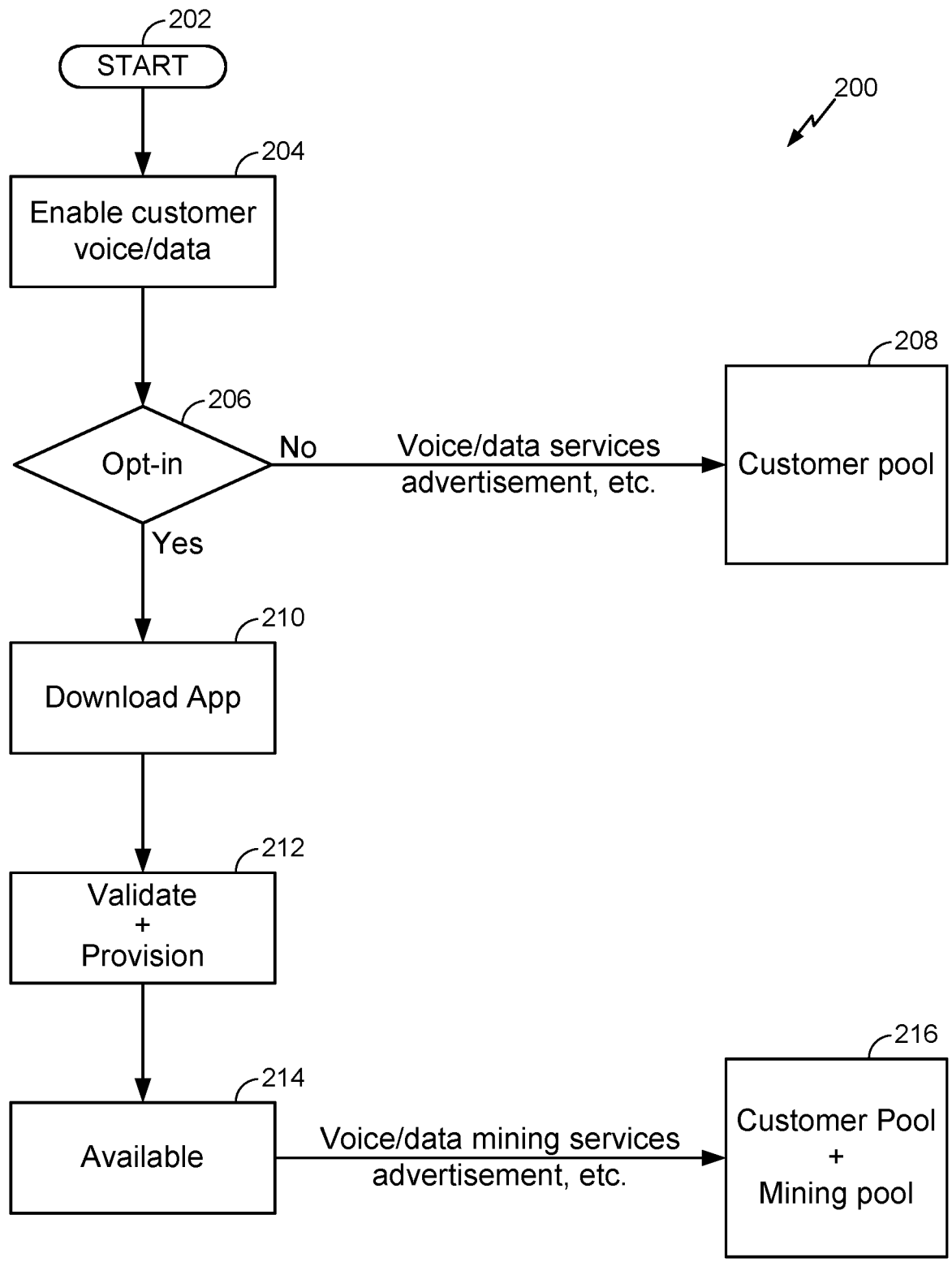
FIG. 2 is a flow diagram illustrating an implementation of an example process that may be performed to facilitate and/or support techniques for blockchain mining using trusted nodes.

With this in mind, attention is now drawn to FIG. 2, which is a flow diagram illustrating an implementation of an example process 200 that may be performed, in whole or in part, to facilitate and/or support one or more operations and/or techniques for blockchain mining using trusted nodes, such as in connection with provisioning of blockchain services by a service provider. As was indicated, in some instances, a service provider may comprise, for example, a mobile service provider, such as MSP 102 of FIG. 1, as one possible example. Example process 200 may, for example, be implemented, at least in part, for a new customer account, existing customer account with a new mobile device, existing customer account adding a new blockchain service, or the like, or any combination thereof. It should be noted that content acquired and/or produced, such as, for example, input signals, output signals, operations, results, etc. associated with example process 200 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

As illustrated, example process 200 may, for example, begin at operation 202 and may proceed to operation 204 at which one or more wireless mobile services, such as voice, data, and/or like services (e.g., advertisement services, etc.) may, for example, be enabled, such as by an MSP via one or more appropriate approaches. For example, in some instances, to enable these or like services, an IMSI, ICCID, IMEI, MSISDN, and/or like identifiers and/or keys, as discussed above, may be registered by and/or with an MSP. At times, other suitable information, such as, for example, a user's billing address, bank account, proof of identity, etc. may also be registered by and/or with an MSP. In some instances, a model, processor, memory size, cryptographic accelerator, if applicable, or like parameters of a mobile device of interest may also be registered by and/or with an MSP. For example, this or like information may be recorded or logged in some manner, such as into a suitable system of an MSP, such as an OSS (e.g., OSS 110 of FIG. 1, etc.). At times, identifiers, keys, parameters, or other suitable records may be encoded via any suitable approach, such as to protect users' privacy, for example. Thus, as was indicated, in some instances, based, at least in part, on this or like records, a computational capability of a mobile device may, for example, be determined and/or certified by an MSP, such as to ensure and/or prove that the mobile device is not an ASIC-accelerated miner with an unfair advantage.

In an implementation, a determined computational capability may, for example, be used, in whole or in part, to assess hashing rates of participating mobile devices, determine appropriate rewards and/or fees, or the like. In some instances, a version of an operating system or other software hosted on mobile devices may also affect mining performance and, as such, may be included in recorded information so as to be used, at least in part, for purposes of a reward and/or fee, or any other appropriate purpose. As will be seen, at times, this or like records may, for example, be included in a main blockchain, such as in a block header of a particular block, as one possible example, or, optionally or alternatively, in one or more sidechain blockchains, such as an internal MSP-related blockchain linked to a billing, rewards, fees, or the like. In this context, "main blockchain" refers to a blockchain with most proof of work, and "sidechain" blockchain or simply "sidechain" refers to a blockchain separate from a main blockchain but interoperable with the main blockchain. For example, a sidechain may be interoperable with a main blockchain via a one-way or two-way communication, such as to facilitate and/or support a transfer of value, assets, rights, etc., confirmation of an identity, or the like. In some instances, an MSP may, for example, also assess a computational capability of a mobile device to determine if a processing power of the mobile device is sufficient to perform requisite mining operations and, thus, whether to allow the mobile device to opt-in to a mining service.

At operation 206, a customer of an MSP may, for example, be asked to opt-in to a mining service, such as via any suitable approach and/or feature, such as an on-screen feature (e.g., digital button, bar, etc.) displayed in an application window of an associated mobile device, just to illustrate one possible implementation. For example, to opt-in, a user may touch or click on a corresponding on-screen button or bar (e.g., "Opt-In to Mining Service," etc.), at which point process 200 may proceed to operation 210 for a mining application download, discussed below. Optionally or alternatively, a customer may, for example, communicate with in-store personnel, which may utilize an internal MSP-related system, such as an OSS, etc. to enroll the customer into a mining service. If, however, a customer chooses not to enroll into a mining service, the customer may decline such an offer also via any suitable approach and/or feature (e.g., click or touch "Decline," etc., communicate to an in-store personnel, etc.) and may subsequently enter a general customer pool for an MSP, as referenced generally at 208, that uses typical wireless or like services (e.g., voice, data, advertisement, etc.).

Thus, at operation 210, an MSP may provide a mining application (e.g., via an OSS, etc.), such as for download and/or installation on an applicable mobile device. Here, any suitable technology and/or approach (e.g., push and/or pull technology, in-store and/or web download, factory pre-installation, etc.) may, for example, be utilized, in whole or in part, as was indicated. At times, a mining application may, for example, be included in new mobile devices via a default application suite offered by an MSP, just to illustrate another possible implementation. As was also discussed, a mining application may run in the background, such as while a mobile device is charging, for example, and may be invisible or transparent to a mobile device's user. A mining application may, for example, be activated, such as to transition an associated node to an active mining node, if a certain battery charging threshold is met. A battery charging threshold may be determined, at least in part, experimentally and may be pre-defined or configured, for example, or otherwise dynamically defined in some manner, depending on a particular application, mobile device, MSP, mining node, or the like. By way of example but not limitation, a battery charging threshold of 100%, meaning that a battery of a mobile device may need to be fully charged for a mining application to be activated, may prove beneficial. Of course, details relating to a battery charging threshold are merely examples to which claimed subject matter is not limited. For example, in some instances, a battery charging threshold of 90% or 95% may also be used, at least in part, or otherwise considered. A pattern of use for a given device, including its charging pattern and/or relative battery exhaustion at start of charge, for example, may be determined via data relayed by an associated mining application, inferred from OSS telemetry logs, or the like. At times, these or like approaches that may include machine learning and/or data mining, such as instead of or in addition to blockchain mining, for example, may be useful optimizations for automating mining application activation policies. These or like policies may optionally include one or more rules that may be defined by an associated user, MSP, etc.

With regard to operation 212, a mining application may, for example, be validated, such as before activation to make sure that it may not serve as an attack vector to discharge a mobile device's battery, such as via a distributed denial-of-service (DDoS) or other attack. In addition, here, one or more other service-related properties and/or aspects may also be provisioned. For example, in some instances, a mining node associated with a mobile device may be assigned a separate identity from that of a user of such a mobile device. A separate miner identity may, for example, be used, at least in part, in one or more applicable mining entries on a sidechain, as discussed below. At times, a separate miner identity may, for example, be linked to a user's identity, such as via an OSS or like system, such as to enable an MSP to allocate a reward and/or fee to a correct user, for purposes of billing, payment adjustments, marketing (e.g., on-screen advertisements, etc.), or the like. At times, a separate miner identity may, for example, run one or more processes in a protected computing environment, such as a suitable Trusted Execution Environment (TEE), virtual machine, secured container, or the like. Further, addresses of one or more local MSP caches may also be provisioned, such as, for example, via a cache directory having one or more blockchain entries. Also, a link (e.g., secure, etc.) that may be used by an MSP to broadcast new blocks for mining, for example, may also be provisioned and/or stored in a suitable memory of a mobile device.

At operation 214, a mobile device with an associated mining node may, for example, be made available to a mining pool, such as after a successful completion of a test activation during a first charging cycle, for example. Here, a mining node may, for example, be made available to a mining pool via a test transaction posted on an MSP's blockchain of internal transactions (e.g., a sidechain, etc.). As referenced at 216, a mining pool may comprise, for example, mobile devices utilizing typical wireless or other services (e.g., voice, data, advertisement, etc.) as well as providing mining services via associated mining nodes, as discussed herein.

Figure 3:
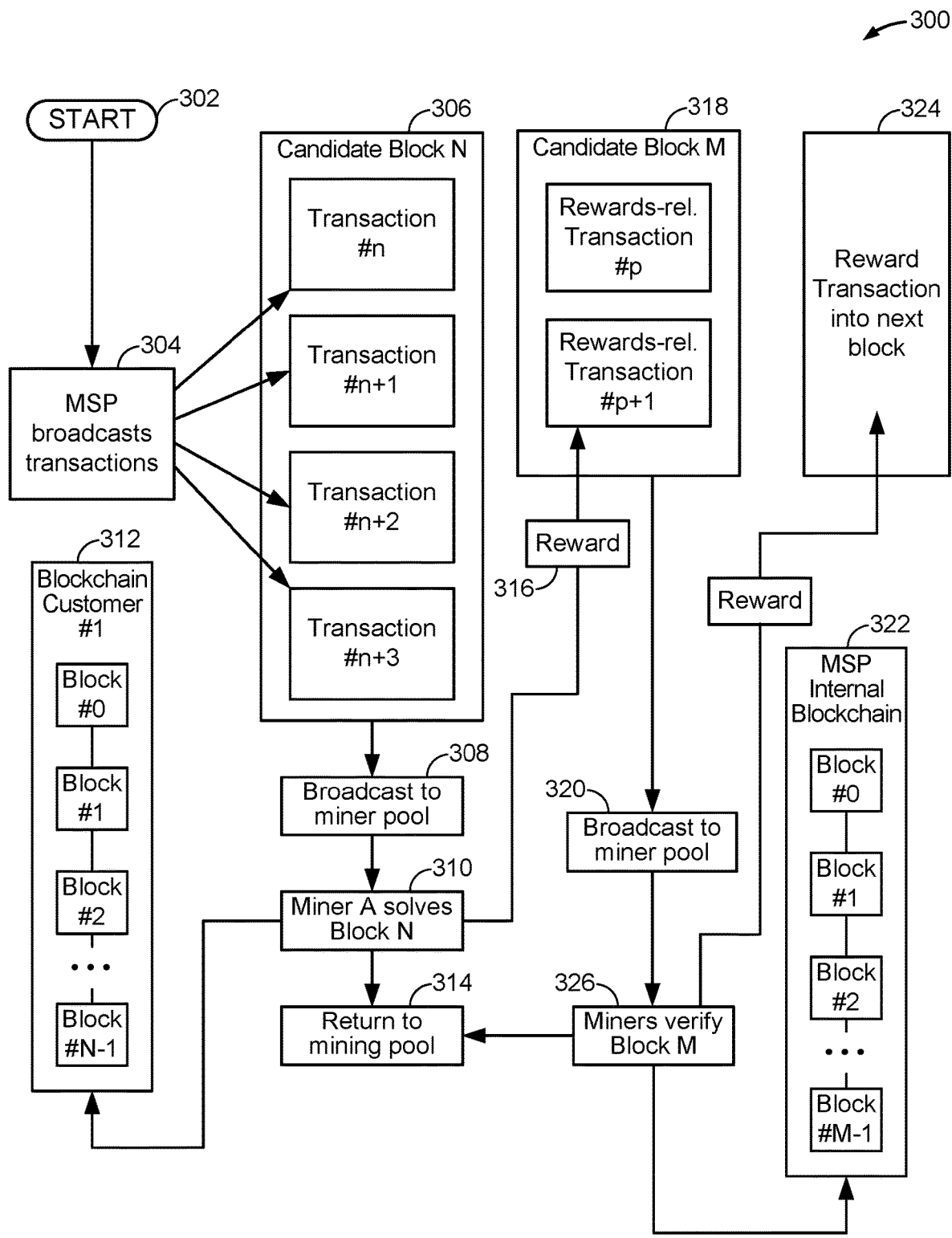
FIG. 3 is a flow diagram illustrating another implementation of an example process that may be performed to facilitate and/or support techniques for blockchain mining using trusted nodes.

FIG. 3 is a flow diagram illustrating an implementation of an example process 300 that may be performed, in whole or in part, to facilitate and/or support one or more operations and/or techniques for blockchain mining using trusted nodes, such as in connection with deployment of blockchain services by a service provider, such as MSP 102 of FIG. 1, as one possible example. It should be noted that example process 300 may be implemented to record blocks of transactions for a main blockchain, sidechain (e.g., for rewards accumulated by MSP's opt-in miners, etc.), etc., or any combination thereof. Likewise, here, it should also be noted that content acquired and/or produced, such as, for example, input signals, output signals, operations, results, etc. associated with example process 300 may comprise and/or be represented via one or more digital signals. Similarly, it should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 300 may, for example, begin at operation 302 and may proceed to operation 304 at which an MSP may broadcast a plurality of on-line transactions to be validated by applicable (e.g., active, etc.) mining nodes, such as part of a candidate block (e.g., block N), referenced at 306. In his context, "candidate" block refers to a block that comprises on-line transactions but does not yet contain a valid proof of work. These on-line transactions may be assembled or aggregated into candidate block 306 by an MSP, appropriate mining node, or any other suitable party, or any combination thereof using one or more appropriate techniques. As discussed herein, at times, verification of transactions may include, for example, one or more nodes verifying that a transfer of assets matches balances, identities for both parties on an individual transaction basis, or the like. Here, a transaction fee may, for example, be paid, at least in part, to validating nodes and may be rolled up into a set of transactions that form a block.

As also discussed herein, in some instances, a validation of blocks may include, for example, one or more nodes finding a solution to a blockchain puzzle for a candidate block via valid proof of work, proof of stake, or like computational approaches, such as for opportunity to earn financial rewards and/or fees. As was indicated, in some instances, broadcasted transactions may, for example, be independently verified using one or more appropriate techniques, such as prior to aggregating into candidate block 306. As referenced at 308, candidate block 306 may, for example, be broadcasted to a pool of miners for validation, such as via finding a solution to a proof-of-work-type puzzle, as was also previously discussed. At times, candidate block 306 may, for example, be validated by applicable miners against one or more published cached copies of a blockchain provided and/or made available by an MSP, such as during provisioning, just to illustrate one possible implementation.

As referenced at 310, the first miner (e.g., illustrated as miner A) to succeed in finding a valid proof of work "wins the lottery" and may publish prior candidate block 306—now solved block—to a cached copy of a main blockchain 312 and/or some other blockchain that miner A is currently using, if applicable. Since, at times, there may be fewer copies of a main blockchain than there may be miners, for example, there may be simultaneous attempts to add a solved block (e.g., block 306, etc.) to a cached copy of main blockchain 312 by multiple miners, thus, creating a so-called blockchain "fork." In this context, "fork" refers to different copies of a blockchain, such as created via two (or more) competing blocks validated at the same time or within a short period of time from each other. Here, a blockchain fork may be resolved first within each cached copy, for example, and then across multiple cached copies, if applicable, such as using any appropriate technique for a consensus, network-wide or otherwise, between multiple copies maintained by miners in a typical blockchain. For example, in some instances, a consensus may be achieved by selecting the greatest-difficulty chain, just to illustrate one possible implementation. As seen at 314, having solved candidate block 306, a miner may, for example, return to a pool of miners, such as to continue blockchain mining by contributing an idle cycle of a mobile device's processing unit, as discussed herein.

Having "won the lottery" (e.g., solved a blockchain puzzle, etc.) and once a consensus, network-wide or otherwise, with respect to adding a verified block to blockchain 312 has been reached, such as using one or more appropriate techniques (e.g., nodes agreeing that structure of block 306 is syntactically valid, coinbase generation transaction is correct, etc.), which may depend on a blockchain, process, MSP, mining node, etc., a reward and/or fee may be conferred upon a winning miner. In at least one implementation, a reward and/or fee may, for example, be divided between a winning miner and an MSP, such as in any suitable manner and/or proportion. For example, as referenced at 316, here, a reward and/or fee, such as structured as a transaction expressing a transfer of value, as one possible example, may be added to a candidate block (e.g., block M) of reward and/or fee-related transactions 318. At operation 320, candidate block of reward and/or fee-related transactions 318 may, for example, be broadcasted to a pool of miners, such as for purposes of verification via a consensus, network-wide or otherwise, to ensure that rewards and/or fees in candidate block 318 are correct, follow the agreed-upon sharing rules, have a proper wallet address, or the like.

In some instances, here, nodes may also apply one or more consensus rules to verify that one or more proper weights are used to make a correct adjustment for a known computational capability (e.g., via IMSI, IMEI, etc.) of a winning miner, if applicable, such as to assure fairness of a reward and/or fee. More specifically, some miners may have processing units, such as multi-core processing units, for example, and/or cryptographic hash accelerators built in or associated with their respective mobile devices and, as such, may be capable of more rapidly computing requisite hashes, as discussed above. Over time it may be expected that newer mobile devices with higher performance processing units and/or cryptographic hash accelerators may, for example, be provisioned by an MSP or other suitable party, such as via a regular or expedited upgrade cadence since mining functions may serve as an implicit incentive through earning a return to defray or offset a cost of an upgrade. For example, a larger weight for a more capable device may encourage mobile device replacements and/or upgrades, and a smaller weight for a less capable device may encourage broader participation. Thus, weighting of a reward and/or fee may, for example, be adjusted in a suitable manner, such as to encourage upgrades, incentivize opt-ins, etc., including encouraging a user of a mobile device to charge and/or enable a mobile device to mine at times of peak demand, or the like.

As referenced at 326, once a miner has completed verification of candidate block 318, it may be added to an internal blockchain of an MSP, referenced at 322, which may comprise a sidechain having validated reward and/or fee-related transactions. Even though a sidechain is used herein, such as for ease of discussion, depending on an implementation, a transaction-processor-specific blockchain, MSP customer rewards tracking blockchain, transaction-processor-specific rewards tracking sidechain, or the like may also be used herein, in whole or in part, which may depend, at least in part, on trading off a balance of privacy against a size of a mining pool available, such as while partitioning up available miners into different chains. As referenced at 324, next block of transactions may, for example, be aggregated, such as for an appropriate reward and/or fee. Here, block 324 may, for example, be aggregated via one or more appropriate techniques, such as by an MSP, randomly selected miner, or the like. In some instances, incentives may be paid to one or more miners in the form of one or more new transactions, for example, which may then enter MSP-internal blockchain 322 and/or billing system (not shown), such as to compensate one or more appropriate miners. It may also be possible to compute rewards and/or fees based, at least in part, on availability of a miner over a billing period, such as via dividing up transaction or other fees equitably among participants, as another possible example, assuming that fairness of a blockchain and/or reward/fee structure enables each participant to win, for example. This may, for example, be implemented under a supervision of an MSP or any other suitable party verifying that a particular miner has not gained an unfair advantage over other miners, such as via trusted computational capabilities, as discussed above.

Thus, at times, a blockchain may conceptually be considered as an accounting ledger of transactions, which may be internal to an MSP (e.g., blockchain 322), such as for tracking credits and/or debits earned by a mobile device customer, for example, or external to an MSP (e.g., blockchain 213), such as representing a service rendered to or by a particular entity (e.g., transaction processor 118, 120, etc. of FIG. 1), for example. In some instances, blockchain 322 may be part of and/or integrated with a suitable billing system, for example. As such, if a particular block is validated, a winning miner (e.g., a mobile device application, user, etc.) may be rewarded accordingly, such as via digital and/or fiat currency, service credits, cellular and/or data connection minutes, coupons that may be redeemed with various merchants including an applicable transaction processor utilizing MSP blockchain services, etc., or any combination thereof. Blockchain 312 may, for example, be employed, in whole or in part, to track a flow of corresponding (e.g., external, etc.) transactions. In at least one implementation, there may be a separate sidechain for a particular transaction processor that may track transactions specific to its customers, processes, operations, etc. As was indicated, at times, suitable transaction and/or blockchain-related information, such as customer identities, mobile device identities, etc. may, for example, be encrypted via any suitable approach (e.g., homomorphic encryption, etc.), such that applicable miners may perform one or more operations on encrypted information without gaining access to and/or revealing particular details.

Depending on a scaling approach, MSP business model, etc., blockchain 322 may comprise, for example, a main or primary blockchain, and one or more other interoperable and/or associated blockchains may comprise, for example, sidechains. Different sidechains may offer and/or provide different rewards and/or fees, such as to attract miners with a higher computational and/or processing capability, for example. At times, different sidechains may also combine data between different transaction processors into a single sidechain. In some instances, this may be beneficial in terms of simplifying pool management for an MSP. At times, a winning miner may, for example be rewarded with a fixed credit balance per billing interval, such as a month, and/or may be issued a statistical reward for a number of minutes an associated mining application was made available to an MSP. Here, it may be useful to keep accounting separate, which may include, for example, a separate type of MSP sidechain to account for minutes made available, miner's capabilities, or the like.

Figure 4:
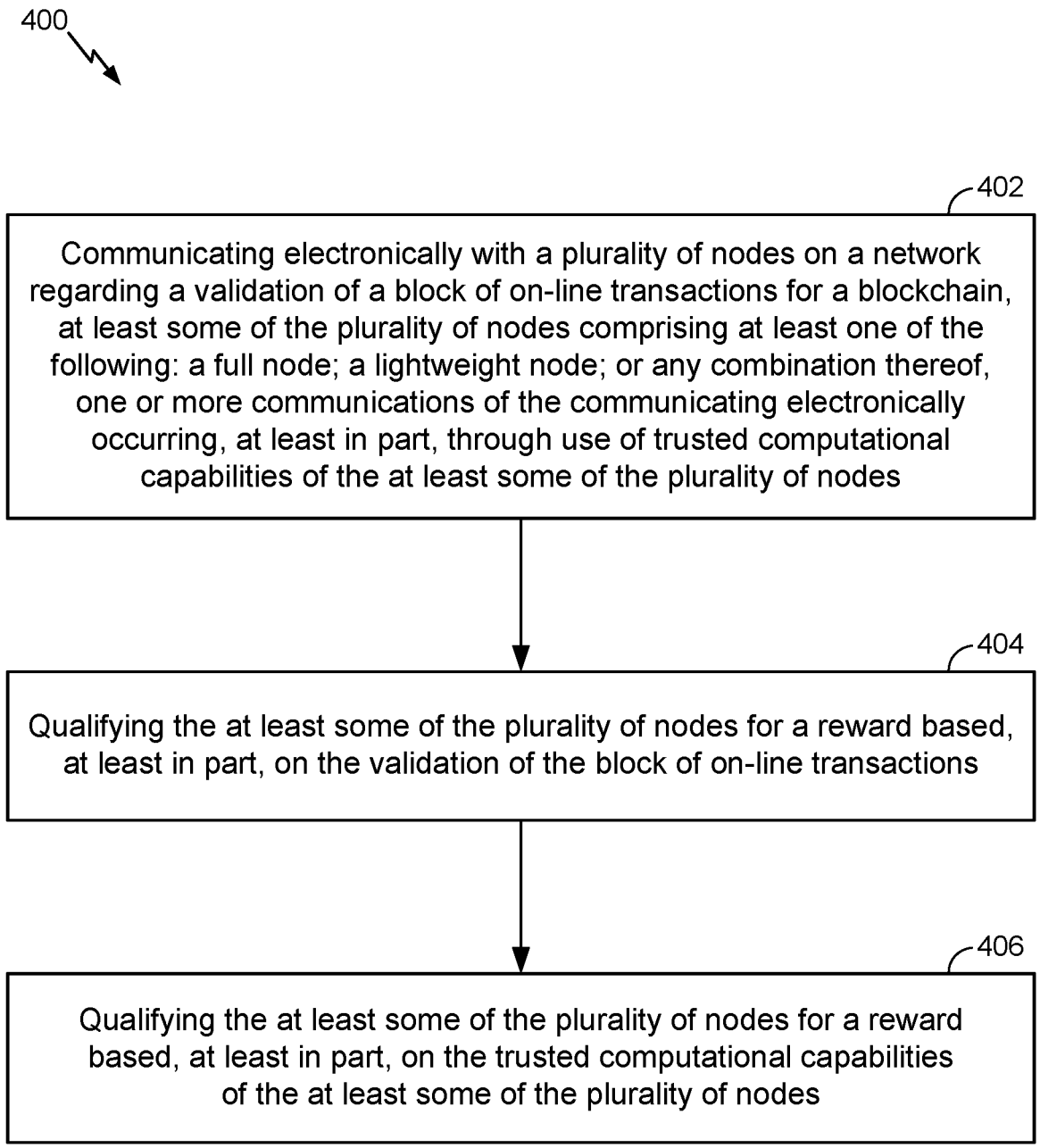
FIG. 4 is a flow diagram illustrating yet another implementation of an example process that may be performed to facilitate and/or support techniques for blockchain mining using trusted nodes.

FIG. 4 is a flow diagram illustrating another implementation of an example process, referenced at 400, that may be performed, in whole or in part, to facilitate and/or support one or more operations and/or techniques for blockchain mining using trusted nodes. As was indicated, in some instances, these one or more operations and/or techniques may, for example, be implemented, in whole or in part, in and/or with mobile devices, such as mobile devices 104, 106, 108, etc. of FIG. 1. Likewise, here, it should be noted that content acquired and/or produced, such as, for example, input signals, output signals, operations, results, etc. associated with example process 400 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 400 may, for example, begin at operation 402 with communicating electronically with a plurality of nodes on a network regarding a validation of a block of on-line transactions for a blockchain, at least some of the plurality of nodes comprising at least one of the following: a full node; a lightweight node; or any combination thereof. As was indicated, one or more of electronic communications may, for example, occur, at least in part, through use of trusted computational capabilities of the at least some of the plurality of nodes. As was indicated, at least some of a plurality of nodes may comprise, for example, mining nodes residing on mobile devices (e.g., via a mining application, etc.) that may be associated and/or registered with a suitable service provider, such as MSP 102 of FIG. 1, just to illustrate one possible implementation. As discussed above, mining nodes may have trusted computational capabilities, such as determined, at least in part, via at least one of the following: an International Mobile Subscriber Identity (IMSI) of at least some of the plurality of nodes; an Integrated Circuit Card Identity (ICCID) of at least some of the plurality of nodes; an International Mobile Equipment Identity (IMEI) of at least some of the plurality of nodes; a Mobile Station Integrated Services for Digital Network number (MSISDN) of at least some of the plurality of nodes; or any combination thereof. As was also discussed, any suitable parameters (e.g., a model, processor, memory size, cryptographic accelerator, etc.) relating to at least some of the plurality of nodes may, for example, be used, in whole or in part.

In some instances, trusted computational capabilities of mining nodes may, for example, be determined, at least in part, via a node-related identity, which may be separate from a mobile device-related identity. As was indicated, a node-related identity may, for example, be created and/or assigned by and/or for an MSP or other suitable party, such as during provisioning, as one possible example. Trusted computational capabilities may, for example, be used, at least in part, to ensure that mining nodes verifying blocks of on-line transactions within a network are not ASIC-accelerated miners with an unfair advantage, as was also indicated. One or more other nodes on a network may comprise, for example, a server device (e.g., an OSS, etc.), a gateway device, a transaction processor, or any other suitable computing device and/or platform capable of facilitating and/or supporting one or more operations and/or techniques for blockchain mining using trusted nodes, such as discussed herein.

Thus, according to an implementation, mining nodes may, for example, be capable of validating a block of on-line transactions for a blockchain, which may comprise a public blockchain, a private blockchain, or any combination thereof. In this context, "public" blockchain refers to a blockchain with an unrestricted and/or permissionless access, and "private" blockchain refers to a blockchain with a restricted and/or permissioned access. Access may, for example, be restricted and/or permissioned with respect to one or more blockchain-related aspects, such as blockchain viewing, block recording, block aggregation, block validation, transaction verification, transaction propagation, consensus and/or participation, or the like. In at least one implementation, broadcasted on-line transactions may, for example, be aggregated into a candidate block by mining nodes independently, such as by accessing an applicable transaction pool, cached or otherwise. In some instances, on-line transactions may, for example, be aggregated into a candidate block by a particular mining node, such as a node that successfully solved a previous block of transactions. At times, on-line transactions, which may include transactions for a "genesis" block may, for example, be aggregated into a candidate block by an MSP or any other suitable party (e.g., a bank, etc.) and may be broadcasted to a network for validation (e.g., as a candidate block, etc.).

In some instances, transactions may, for example, be multicast to a select set of miners in a specific mining pool (e.g., based on capabilities, charging cycle, etc.), such as a virtualized overlay sub-network allocated from an MSP network. To select transactions for a block, any suitable priority metric (e.g., age, size, fees, reward, etc.) may, for example, be utilized, in whole or in part. At times, on-line transactions may be independently verified by applicable mining nodes, such as prior to being aggregated into a candidate block, for example, using one or more appropriate techniques (e.g., via a check transaction, check inputs, etc. function, etc.). In some instances, on-line transactions may, for example, be temporarily placed in a candidate transaction pool of a mining node, MSP, etc., such as prior to their inclusion into a candidate block. Aggregating on-line transactions into a candidate block may also involve generating a so-called "coinbase" transaction input, for example, specifying the amount of reward, transaction fees, or any other suitable compensation payable to a winning mining node and/or an MSP (or any other suitable party). Depending on an implementation, a "coinbase" transaction may, for example, be generated by a mining node, MSP, or any combination thereof.

As was also discussed, a block of on-line transactions may, for example, be validated by an active mining node via finding valid proof of work while using an idle cycle of a processing unit of an associated mobile device as it completes its normal charging cycle (e.g., at night, etc.). Here, active mining nodes running on mobile devices registered with an MSP may repeatedly hash a header of a candidate block, such as using a proof-of-work-type process, for example, until a particular node finds a resulting cryptographic hash that matches a specific target, as discussed above. In some instances, these one or more cryptographic hashing operations may, for example, be implemented, at least in part, via a SHA256-type process (e.g., double-SHA256, etc.), such as for a target comprising a 256-bit number written as hexadecimal, though claimed subject matter is not so limited. Any other suitable cryptographic hashing operations now known (e.g., Scrypt, Blake-256, CryptoNight, HEFTY1, Quark, SHA-3, scrypt-jane, scrypt-n, etc.) and/or later developed may also be employed herein, in whole or in part, or otherwise considered. A particular target may, for example, be retargeted from time to time, such as upon and/or prior to an introduction of more powerful cryptographic hash accelerators for inclusion into mobile devices, as discussed above. In this context, "retargeting" refers to adjusting a proof-of-work difficulty of a blockchain problem or puzzle. Retargeting may be based, at least in part, on a bounded computational capability of active mining nodes on a network, amount of time for solving a puzzle, or any other suitable parameters.

Depending on an implementation, one or more electronic communications regarding a validation of a block of on-line transactions for a blockchain may, for example, be implemented via any suitable communications network. For example, one or more electronic communications may be implemented via a peer-to-peer-type network, a cellular network, a distributed network, a decentralized network, a wireless communications network, a wired communications network, or the like, or any combination thereof. These or like networks are generally known and need not be described in greater detail. At times, different MSP networks may, for example, be given different weights, such as to differentiate between these or like networks due, at least in part, to different transport costs and/or latencies. As a way of illustration, a particular MSP may maintain, for example, a number of networks, such as 2G, 3G, 4G, LTE, or like networks. Certain customers, such as those with more capable devices (e.g., latest models, etc.) may, for example, be capable of switching between these or like networks. Thus, a cost of updating blockchains on faster networks may follow a pattern of being much faster, but initially more costly, and then rapidly drop in price as faster networks take over. An MSP may implement credits and/or debits that may reflect these or like infrastructure costs in a rewards and/or fee structure, as well as other incentives, such as to steer customers onto a particular network depending on various factors including costs, utilization, time-of-day, reliability, or the like. Of course, these are merely details to which claimed subject matter is not limited. In some instances, such as in addition to mining nodes, a network may comprise, for example, any other suitable node, such as a computing device and/or platform capable of facilitating and/or supporting one or more operations and/or techniques for blockchain mining using trusted nodes (e.g., a gateway device, location server, etc.).

Continuing with the above discussion, a validated block of on-line transactions may, for example, be added to a blockchain of interest. For example, as discussed above, a validated block may be added to a main blockchain, sidechain, or any combination thereof, which may depend on a reward and/or fee structure, blockchain infrastructure, MSP, mining node, blockchain service, or the like. A validated block may, for example, be added to a blockchain of interest by a winning miner, MSP, or any other suitable party, or any combination thereof. In some instances, prior to inclusion into a blockchain of interest, a validated block may, for example, be verified by a number of other mining nodes, such as for purposes of a consensus, network-wide or otherwise, so as to ensure fairness and/or correctness of a reward and/or fee, proof-of-work solution, or the like. After the addition of a new block to a blockchain, there may be a settlement of rewards and/or fees, essentially a finalization of a transaction where no one challenges a new block soon enough to be able to unravel a prior commitment. Typically, such a settlement may take place after six blocks have been added, though claimed subject matter is not so limited. For example, at times, this parameter may be set differently for different blockchains depending upon various factors, such as real-time transaction commitments, redeemability, etc., threats against which defenses are being mounted, etc., just to illustrate a few possible examples.

With regard to operation 404, at least some of the plurality of nodes may, for example be qualified for a reward and/or fee based, at least in part, on the validation of the block of on-line transactions. For example, as discussed above, validating a candidate block may qualify a wining miner for a monetary reward, such as in the form of a digital cryptographic currency, physical currency, fiat currency, or other form of legal tender, and/or non-monetary reward, such as, for example, in the form of a manufacturer and/or store coupon, discount for a wireless service, mobile device, merchandize, etc., mobile device and/or service upgrades, or the like, or any combination of a monetary and non-monetary reward. A type and/or amount of a reward may be determined by any suitable party, such as an MSP, for example, and may be allocated in any suitable manner (e.g., divided between a winning miner and an MSP, etc.). Similar approach may, for example, be applied to fees, such as transaction fees, as one possible example, if applicable.

As referenced via operation 406, in some instances, at least some of the plurality of nodes may, for example be qualified for a reward and/or fee based, at least in part, on the trusted computational capabilities of the at least some of the plurality of nodes. For example, as was also discussed, certain mining nodes on a network may have higher computational capabilities, such as via having one or more built-in cryptographic hash accelerators, for example, that certain other mining nodes, such as those associated with legacy or older mobile devices without such accelerators, as one example. As such, here, weights or like factors may, for example, be used, at least in part, to adjust a particular reward and/or fee in view of a known computational capability (e.g., determined via IMSI, IMEI, etc.) of a winning miner, such as to assure fairness. To illustrate, a larger weight may, for example, be allocated or assigned to a mining node without a cryptographic hash accelerator (or with a less powerful cryptographic hash accelerator, etc.), and a smaller weight may, for example, be allocated or assigned to a mining node with a cryptographic hash accelerator (or with a more powerful cryptographic hash accelerator, etc.). In some instances, weight assignments may, for example, depend, at least in part, on a business approach of an MSP, which may be negotiated with a particular transaction processor and/or mobile device holders and/or partners. For example, an MSP may want to encourage a "level playing field" where any given mobile device holder may receive statistically equal value rewards over time, meaning that lower performing mobile devices may be given larger awards than higher performing mobile devices. This may, for example, encourage mobile device users to keep their older devices for longer periods of time.

At times, an MSP may, for example, offer more capable mobile devices a magnified reward and/or fee to encourage migration to newer and/or faster mobile devices with higher performing hash accelerators and/or network connections. This may help an MSP to move off of older networks, such as 2G, for example. By way of example but not limitation, a weight=1.0 may be assigned so that a higher performing mobile device may receive rewards and/or fees more frequently due, at least in part, to their higher computational and/or networking capability, memory resources, or the like. As such, weighting of a reward and/or fee may, for example, be encourage upgrades, incentivize opt-ins, or the like. Of course, claimed subject matter is not limited to a particular weight assignment.

In at least one implementation, a reward and/or fee may, for example, depend and/or be based, at least in part, on an individual contribution to a block validation of at least some of the plurality of nodes, a shared contribution to a block validation of at least some of the plurality of nodes, or any combination thereof. For example, in some instances, a reward and/or fee may be allocated to a miner that individually contributed to solving a particular blockchain puzzle due, at least in part, to its more effective and/or more efficient mining hardware, such as a built-in cryptographic hash accelerator. At times, however, such as to ensure fairness to miners with less effective and/or less efficient (e.g., older, etc.) hardware, an MSP or any other suitable party may, for example, coordinate mining activity of a plurality of miners via splitting a work of searching for a blockchain solution and rewarding these miners according to their shared contribution. For example, here, if a particular mining node of these plurality of nodes finds a valid proof of work for a block, an MSP (or some other party) may allocate a reward and/or fee in proportion to a number of hashing operations or some other effort (e.g., availability of a miner during a billing cycle, etc.) the plurality of nodes contributed to solving the block. Again, these are merely examples relating to an individual and/or shared contribution, and claimed subject matter is not so limited. Any other suitable types of contributions to a shared mining effort may, for example, be used herein, in whole or in part, or otherwise considered. Shared contributions may also be verified via, for example, a consensus approach, network-wide or otherwise, and may be recorded in a sidechain, such as for purposes of billing, tracking, or the like.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, 4th, or 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 5:
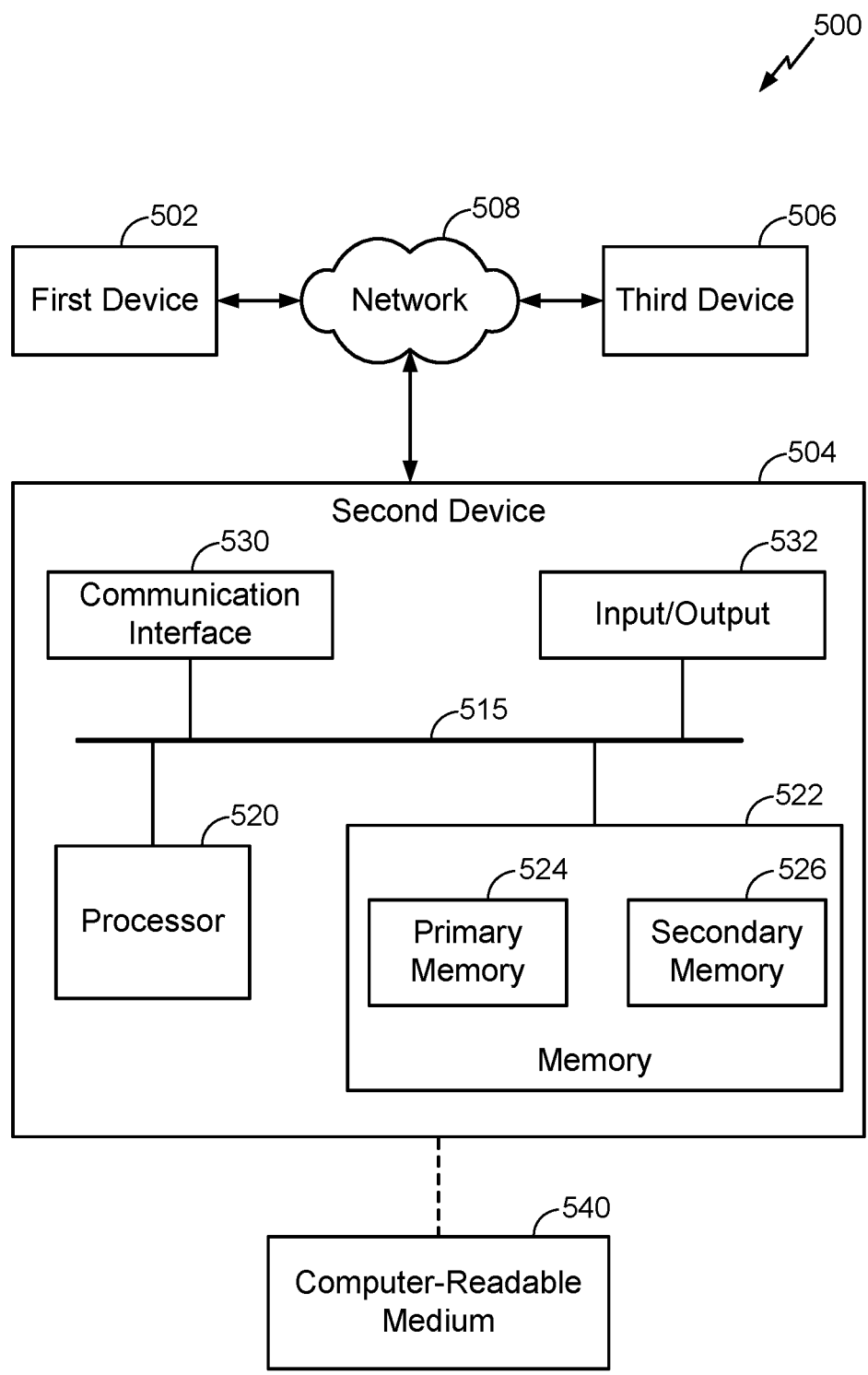
FIG. 5 is a schematic diagram illustrating an implementation of an example computing environment associated with a server.

In one example embodiment, as shown in FIG. 5, a system embodiment may comprise a local network (e.g., a second device 504 and a computer-readable medium 540) and/or another type of network, such as a computing and/or communications network. For purposes of illustration, therefore, FIG. 5 shows an embodiment 500 of a system that may be employed to implement either type or both types of networks, such as in connection with one or more operations and/or techniques for blockchain mining using trusted nodes. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-4 of the present disclosure.

As further illustrated in FIG. 5, in an embodiment, first and third devices 502 and 506 may be capable of rendering a graphical user interface (GUI) for a network device and/or a computing device, for example, so that a user-operator may engage in system use. Device 504 may potentially serve a similar function in this illustration. Likewise, in FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 515, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 504, as depicted in FIG. 5, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. As also discussed, a computing device and/or a networking device may also have other identities. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may be utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Thus, in some instances, processor 520 may facilitate and/or support, such as via a communication interface 530, for example, communicating electronically with a plurality of nodes on a network regarding a validation of a block of on-line transactions for a blockchain, at least some of the plurality of nodes comprising at least one of the following: a full node; a lightweight node; or any combination thereof, one or more communications of the communicating electronically occurring, at least in part, through use of trusted computational capabilities of the at least some of the plurality of nodes, such as to implement operation 402 of FIG. 4, at least in part. In addition, in at least one implementation, processor 520 may facilitate and/or support, for example, qualifying the at least some of the plurality of nodes for a reward based, at least in part, on the validation of the block of on-line transactions, such as to implement operation 404 of FIG. 4, at least in part. Also, in some instances, processor 520 may facilitate and/or support, for example, qualifying the at least some of the plurality of nodes for a reward based, at least in part, on the trusted computational capabilities of the at least some of the plurality of nodes, such as to implement operation 406 of FIG. 4, at least in part. Generated signals may also be stored in memory, also previously suggested. As was also discussed, in some instances, second device 504 may comprise one or more cryptographic hash accelerators, which may or may not be part of processor 520. It should be noted that any suitable types of cryptographic accelerators may be utilized herein. For example, in some instances, one or more key generators seeded by random number generators, such as for public key based authentication (e.g. RSA, etc.) and/or block encryption (e.g. AES, etc.) for data protection, at rest (e.g., stored as one or more signals and/or states in memory 522) or networked.

Memory 522 may store electronic files and/or electronic documents, such as relating to one or more users, and may also comprise a device-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Continuing with FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
    electronically identifying a plurality of blockchain mining nodes residing on mobile devices associated with a mobile service provider (MSP) and having trusted computational capabilities to perform a validation of a block of on-line transactions for a blockchain;
    determining patterns of use of the mobile devices associated with the MSP;
    prioritizing processing tasks for the plurality of blockchain mining nodes to perform the validation of the block of on-line transactions based, at least in part, on the patterns of use; and
    communicating electronically with the plurality of blockchain mining nodes on a network regarding the validation of the block of on-line transactions for the blockchain based, at least in part, on the prioritizing, at least some of the plurality of blockchain mining nodes comprising at least one of the following: a full node; a lightweight node; or any combination thereof,
    one or more communications of the communicating electronically occurring, at least in part, through use of the trusted computational capabilities of the at least some of the plurality of blockchain mining nodes.

2. The method of claim 1, wherein the prioritizing is implemented, at least in part, via a blockchain scheduler.

3. The method of claim 1, wherein the communicating electronically with the plurality of blockchain mining nodes further comprises communicating electronically regarding at least one of the following: a scheduled participation of the at least some of the plurality of blockchain mining nodes in the validation of the block of on-line transactions for the blockchain; an estimated degree of difficulty to perform the validation of the block of on-line transactions for the blockchain; an estimated degree of difficulty to perform the validation of the block of on-line transactions for the blockchain; an allocation of incentives for the validation of the block of on-line transactions for the blockchain; or any combination thereof.

4. The method of claim 1, wherein the trusted computational capabilities are being verified based, at least in part, on digital content captured via a service agreement between the mobile devices and the mobile service provider (MSP).

5. The method of claim 4, wherein the patterns of use comprise at least one of the following: charging patterns; blockchain mining patterns; communication patterns; battery exhaustion patterns; or any combination thereof.

6. The method of claim 4, wherein the prioritizing the processing tasks further comprises:
    determining availability of the plurality of blockchain mining nodes to perform the validation of the block of on-line transactions for the blockchain; and
    electronically scheduling the processing tasks based, at least in part, on the availability.

7. The method of claim 4, wherein the prioritizing the processing tasks further comprises adjusting an estimated degree of difficulty to perform the validation of the block of on-line transactions for the blockchain based, at least in part, on at least one of the following: the patterns of use; the trusted computational capabilities; the network; a service agreement between the mobile devices and the MSP; or any combination thereof.

8. The method of claim 1, wherein the prioritizing the processing tasks further comprises electronically assigning the at least some of the plurality of blockchain mining nodes to at least one of the following: a general mining pool; a specific mining pool; or any combination thereof.

9. The method of claim 8, wherein the at least some of the plurality of blockchain mining nodes are assigned to the specific mining pool based, at least in part, on at least one of the following: the trusted computational capabilities; the patterns of use; or any combination thereof.

10. The method of claim 8, wherein the general mining pool comprises a ready-to-mine pool.

11. The method of claim 1, wherein the prioritizing the processing tasks further comprises:
    electronically determining processing capabilities of the at least some of the plurality of blockchain mining nodes residing on the mobile devices; and
    electronically assigning weights to the at least some of the plurality of blockchain mining nodes based, at least in part, on the processing capabilities.

12. The method of claim 11, further comprising adjusting a reward and/or fee for the validation of the block of on-line transactions based, at least in part, on the processing capabilities.

13. The method of claim 1, wherein the prioritizing the processing tasks further comprises:
    electronically determining a battery level of the mobile devices; and
    electronically scheduling the validation of the block of on-line transactions based, at least in part, on the battery level.

14. The method of claim 1, wherein the plurality of blockchain mining nodes comprises at least one of the following: a plurality of active mining nodes; a plurality of inactive mining nodes; or any combination thereof.

15. The method of claim, further comprising electronically transitioning the at least some of the plurality of blockchain mining nodes into active status or inactive status based, at least in part, on the patterns of use.

16. An apparatus comprising:
    one or more processors and a memory, the one or more processors coupled to the memory to:
        electronically identify a plurality of blockchain mining nodes that reside on mobile devices associated with a mobile service provider (MSP) and have trusted computational capabilities to perform a validation of a block of on-line transactions for a blockchain;
        determine patterns of use of the mobile devices associated with the MSP;
        prioritize processing tasks for the plurality of blockchain mining nodes to perform the validation of the block of on-line transactions based, at least in part, on the patterns of use; and initiate one or more electronic communications with the plurality of blockchain mining nodes on a network regarding the validation of the block of on-line transactions for the blockchain based, at least in part, on the prioritized processing tasks, at least some of the plurality of blockchain mining nodes to comprise at least one of the following: a full node; a lightweight node; or any combination thereof, the one or more electronic communications to occur, at least in part, through use of the trusted computational capabilities of the at least some of the plurality of blockchain mining nodes.

17. The apparatus of claim 16, wherein the one or more electronic communications are to be initiated regarding at least one of the following: a scheduled participation of the at least some of the plurality of blockchain mining nodes in the validation of the block of on-line transactions for the blockchain an estimated degree of difficulty to perform the validation of the block of on-line transactions for the blockchain; an allocation of incentives for the validation of the block of on-line transactions for the blockchain; or any combination thereof.

18. The apparatus of claim 16, wherein the trusted computational capabilities are to be verified based, at least in part, on digital content captured via a service agreement between the mobile devices and the MSP.

19. An article comprising:
a non-transitory storage medium having instructions stored thereon executable by a special purpose computing platform to:

electronically identify a plurality of blockchain mining nodes that reside on mobile devices associated with a mobile service provider (MSP) and have trusted computational capabilities to perform a validation of a block of on-line transactions for a blockchain;

determine patterns of use of the mobile devices associated with the MSP;

prioritize processing tasks for the plurality of blockchain mining nodes to perform the validation of the block of on-line transactions based, at least in part, on the patters of use; and initiate one or more electronic communications with a plurality of blockchain mining nodes on a network regarding the validation of the block of on-line transactions for the blockchain based, at least in part, on the prioritized processing tasks, at least some of the plurality of blockchain mining nodes to comprise at least one of the following: a full node; a lightweight node; or any combination thereof, the one or more of the electronic communications to occur, at least in part, through use of the trusted computational capabilities of the at least some of the plurality of blockchain mining nodes.

20. The article of claim 19, wherein the trusted computational capabilities are to be verified based, at least in part, on digital content captured via service agreement between the mobile devices and the MSP.

* * * * *